Aug. 8, 1950          E. PULSFORD          2,518,177
INTERMITTENT SLIDE GRIP DRIVE

Filed June 25, 1947          4 Sheets-Sheet 1

INVENTOR.
Ernest Pulsford
by Ward Crosby & Neal
Attys

Aug. 8, 1950     E. PULSFORD     2,518,177
INTERMITTENT SLIDE GRIP DRIVE
Filed June 25, 1947     4 Sheets-Sheet 3

INVENTOR.
Ernest Pulsford
BY
Ward Crosby + Neal
Attys

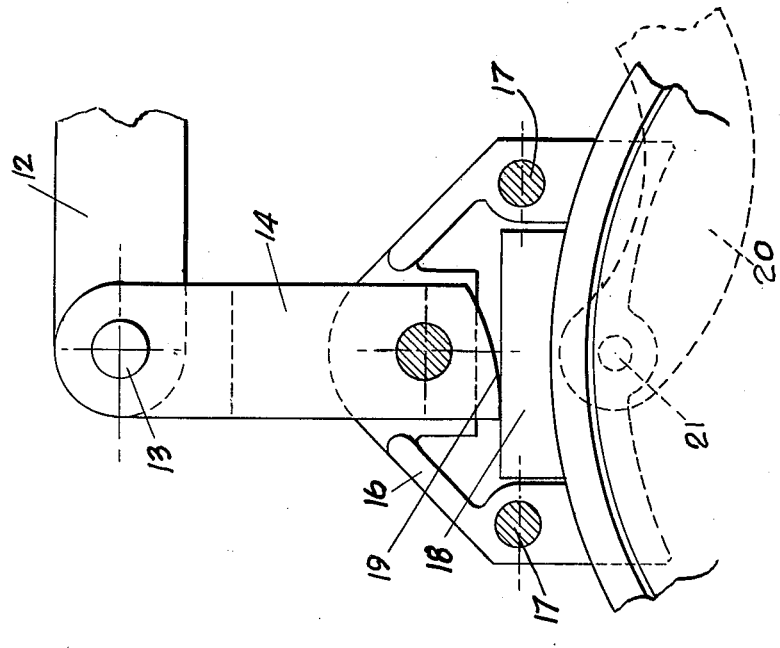
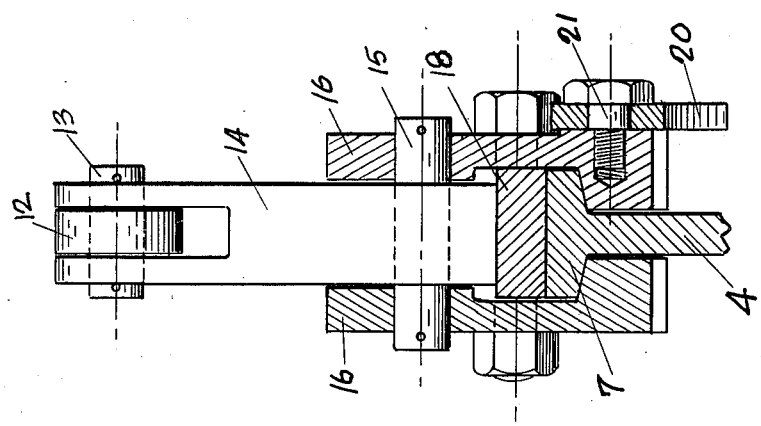

Patented Aug. 8, 1950

2,518,177

UNITED STATES PATENT OFFICE 2,518,177

INTERMITTENT SLIDE GRIP DRIVE

Ernest Pulsford, Nutley, N. J.

Application June 25, 1947, Serial No. 756,915

4 Claims. (Cl. 74—116)

The invention relates to a power transmission mechanism of a type which may be used in winches, hoists or the like, to convert either oscillating or continuous rotary movement of a drive shaft into uni-directional rotary movement of a driven shaft or rotary drum such as is used in winches or hoists. Friction drivers are used which may be per se of previously known construction, and in accordance with the present invention the drive shaft is provided with angularly displaced cranks or eccentrics, each of which carries a connecting rod; friction drivers are angularly displaced about a driven wheel, with respect to which wheel, each friction driver is movable between wheel gripping and wheel releasing relation, and the connecting rods are respectively connected in pivoted relation to the friction drivers in such manner that the friction drivers alternately approach and recede from one another as the driving shaft is rotated or oscillated, and during their approaching and receding movements aforesaid, the friction drivers alternately assume wheel gripping and wheel releasing positions. Preferably there is used in connection with the mechanism certain devices for limiting the above mentioned approaching and receding movements of the friction drivers, and for conjointly adjusting the latter to positions wherein the driven wheel is released or disconnected from the driving mechanism. Further objects and advantages of the invention will be in part obvious and in part specifically referred to in the description hereinafter contained which, taken in conjunction with the accompanying drawings, discloses a preferred form of power transmission mechanism constructed to operate in accordance with the invention. The disclosure however should be considered as merely illustrative of the principles of the invention in its broader aspects. In the drawings—

Fig. 4 is a detail section taken on line 4—4 of Fig. 2, looking in the direction of the arrows.

Fig. 5 is a side view, with certain parts removed, of the mechanism shown in Fig. 4.

Figure 1:
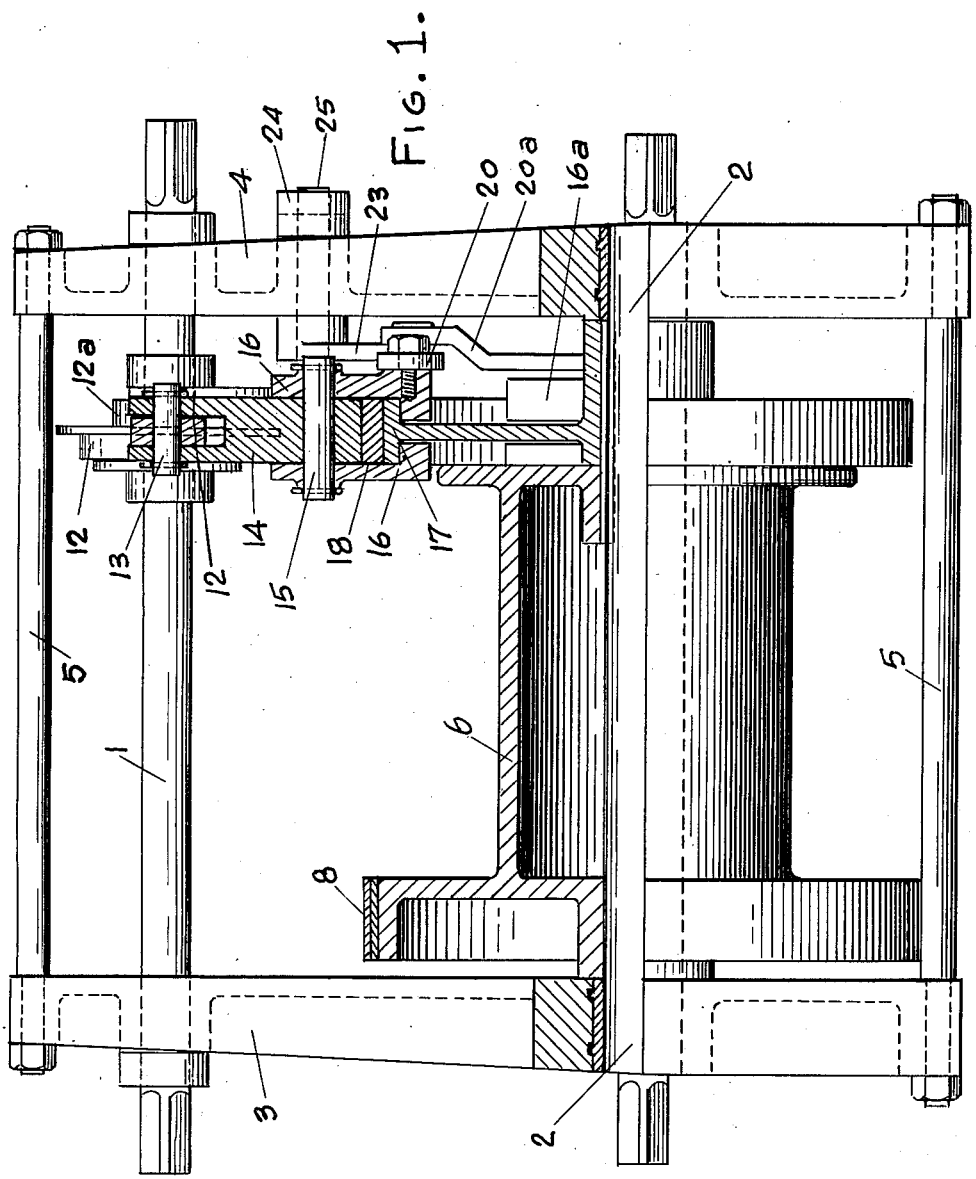
Fig. 1 is a side elevation, partly in section, showing a winch having applied thereto a power transmission mechanism which is constructed to operate in accordance with the invention, certain of the parts appearing in section.
Figure 2:
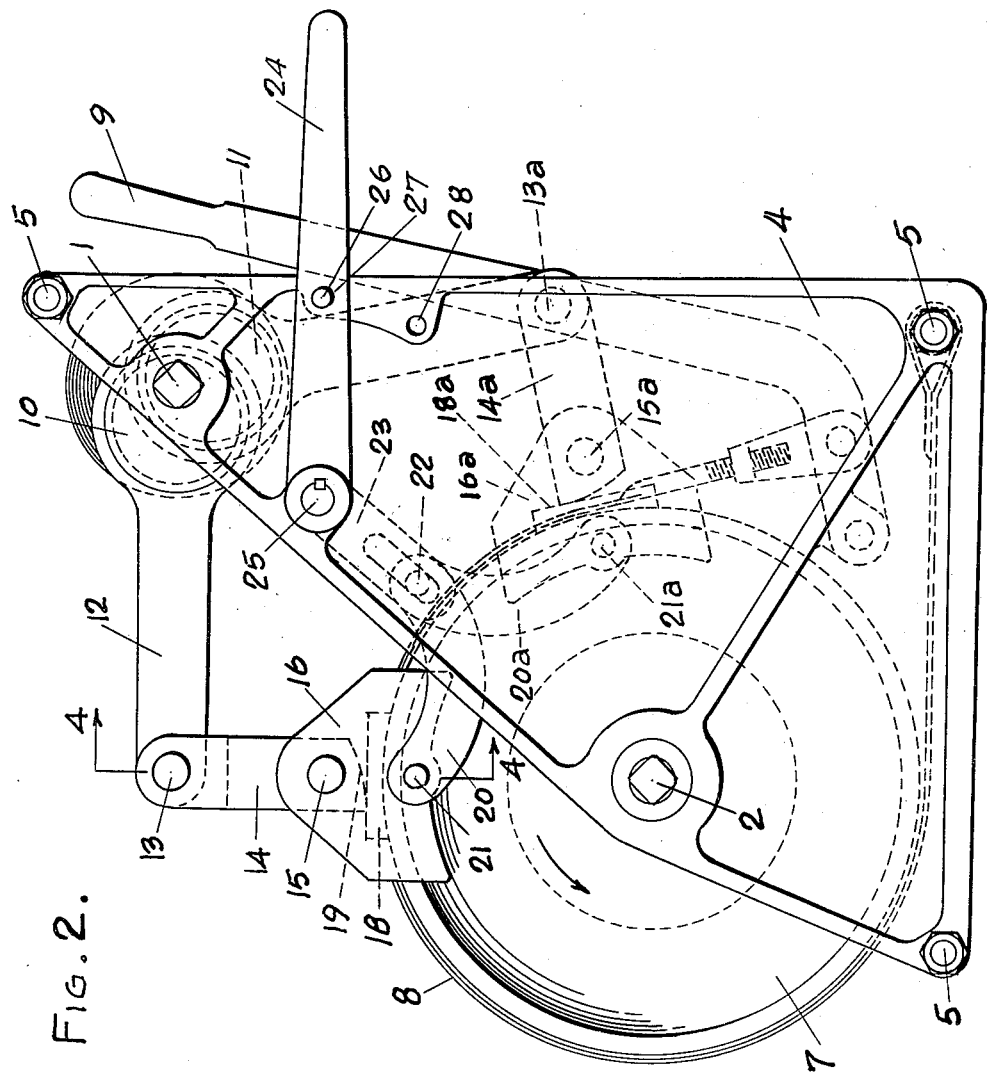
Fig. 2 is an end elevation of the machine shown in Fig. 1.

Referring first to Figs. 1 and 2, the invention is shown as applied to a winch having a driving shaft 1 and driven shaft 2 journaled in side frames 3 and 4, which latter are connected by cross rods 5. The driven shaft 2 has fixed thereto a winding drum 6 and a driven wheel 7. The drum 6 is also shown as provided with a releasable friction brake, consisting of a friction band 8 which may be tightened or released by shifting an appropriate hand lever 9.

Figure 3:
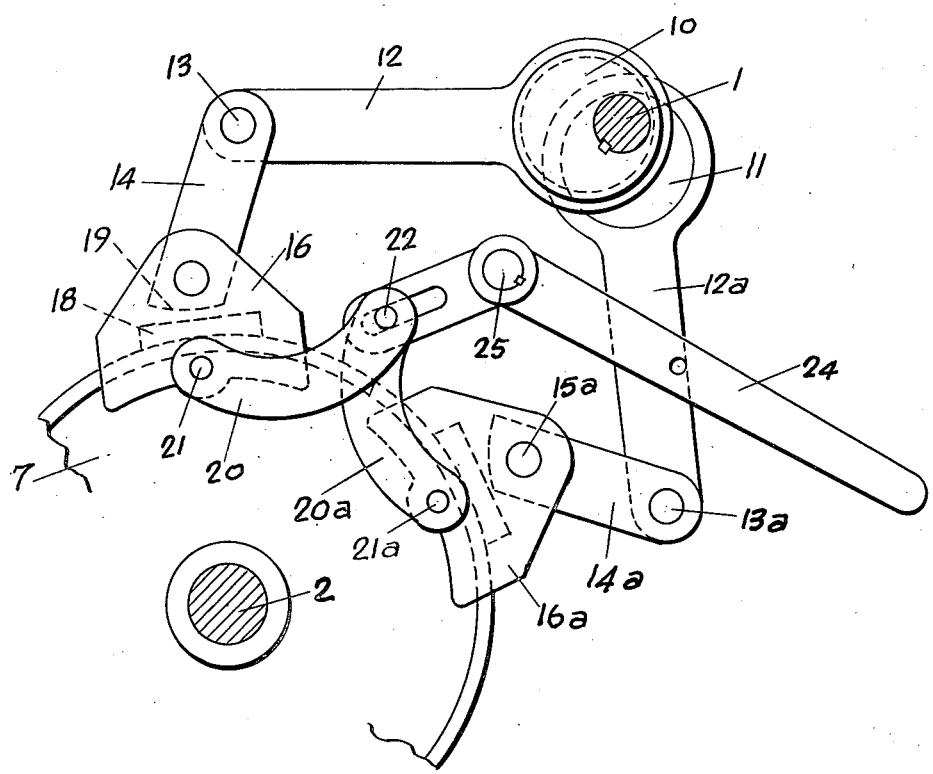
Fig. 3 is an end elevation showing the main operating parts of the power transmission mechanism in operative relation to the driving shaft and driven wheel.

The drive shaft 1 may be oscillated or rotated by hand, or by power, as desired, and carries eccentrics 10 and 11 which are angularly disposed with respect to each other as best shown in Fig. 3. The eccentric 10 carries a connecting rod 12 which at its outer end is pivotally connected by a pin 13, to a link 14 which latter is in turn pivotally connected by pin 15 to an appropriate form of friction driver, i. e. a driver which will frictionally grip and turn the driven wheel 7 when the connecting rod 12 moves endwise in one direction, and release itself from gripping relation to wheel 7 when the connecting rod 12 moves in the opposite direction.

In the illustrated form of the invention this friction driver is provided with side plates 16 which are mounted on pin 15 on opposite sides of the link 14, and extend behind the rim of wheel 7 as shown in Figs. 1 and 4, the side plates being also held together by bolts 17 (Fig. 5). A friction shoe 18 is housed within the side plates 16 and cooperates with a cam shaped surface 19 on link 14 in such manner that as the parts appear in Fig. 2, if the connecting rod 12 is moving to the left, the link 14 presses the shoe 18 into gripping engagement with the periphery of wheel 7 and thus turns the latter in counterclockwise direction. When connecting rod 12 moves toward the right as the parts appear in Fig. 2, the link 14 tilts to release the friction driver from gripping engagement with wheel 7.

The eccentric 11 also actuates a friction driver having a series of parts similar to those above described, comprising a connecting rod 12a, pin 13a, link 14a, pin 15a, side plates 16a and shoe 18a respectively similar to the above described parts 14—18.

The above described friction drivers are angularly displaced about the periphery of wheel 7 as shown in Figs. 2 and 3, and the result is that if drive shaft 1 be either oscillated angularly or rotated, the friction drivers are caused to alternately approach and recede from one another about the periphery of wheel 7. Fig. 2 shows the friction drivers in a relatively receded or separated phase wherein the forward friction driver, i. e. the left hand driver as the parts appear in Fig. 2, has about completed is wheel gripping movement during which it has turned wheel 7 counter-clockwise, and the rearward friction driver has in the meantime been released from gripping engagement with the wheel. Upon continuation of rotation of drive shaft 1, or turning movement thereof in an opposite direction, the forward friction driver will be released from gripping engagement with wheel 7 and at the same time the rearward friction driver will come into gripping engagement with the wheel. During this phase the two friction drivers will approach each other. In other words, as the friction drivers recede from one another, the forward friction driver grips and turns wheel 7 while the rearward friction driver is released from gripping engagement with the wheel, and as the friction drivers approach one another, the rearward friction driver grips and turns the wheel and the forward friction driver is released from gripping engagement with the wheel. Unidirectional rotation of wheel 7 and driven shaft 2 may be obtained by rotation of the drive shaft 1 in either direction, or by angular rocking movements of drive shaft 1.

To insure action of the friction drivers in proper relation as above described and to prevent either of them from being carried around too far on wheel 7, I prefer to provide devices for limiting the extent of the above described approaching and receding movements of the friction drivers. In the illustrated form of the invention, the friction drivers are interconnected by links 20 and 20a which are pivotally connected at one end respectively to the pins 21 and 21a on the side plates 16 and 16a respectively, the other ends of the links 20 and 20a being pivotally connected to a pin 22 which engages in a normally stationary slotted arm 23 (Figs. 2 and 3). The links 20 and 20a and the slot in arm 23 are so proportioned as to afford the necessary approaching and receding relative movements of the friction drivers, but the pin 22 by engagement in the slotted arm 23 prevents either friction driver from being frictionally carried around too far on wheel 7 at the end of its respective wheel gripping movement.

In the illustrated embodiment of the invention, the mechanism is adjustable to hold both friction drivers conjointly in wheel releasing positions. As shown, the slotted arm 23 is fixed to a hand lever 24 which is movable pivotally about a pin 25 in side frame 4, the lever 24 being releasably locked in position by a pin 26 (Fig. 2) engageable selectively in the holes 27 and 28 in the side frame. In the position shown in Fig. 2, the friction drivers are in operative relation to wheel 7, but if lever 24 be moved to the position shown in Fig. 3, wherein the pin 26 is engaged in hole 28 (Fig. 1) the friction drivers are conjointly shifted angularly with respect to drive wheel 7 in to such positions that regardless of the angular position of drive shaft 1, neither of the friction drivers will come into gripping engagement with wheel 7. When the mechanism is applied to a winch or hoist, the hand lever 9 will usually be set to release brake band 8 while the mechanism is winding up drum 6, after which the brake will be set. Then when it is desired to release the drum the lever 24 will be moved to the position shown in Fig. 3, wherein both of the friction drivers are held in releasing positions with respect to wheel 7, and lever 9 will be moved to release the brake to lower the load.

While the invention has been disclosed as applied to a power transmission mechanism having the above described specific parts, it should be understood that changes may be made therein without departing from the invention in its broader aspects, within the scope of the appended claims.

I claim:

1. A power transmission mechanism of the character described including a drive shaft, cranks angularly displaced with respect to each other about said drive shaft, connecting rods respectively engaging said cranks in permanently diverging relationship, a driven wheel, friction drivers angularly displaced with respect to one another about said driven wheel and each movable between wheel gripping and wheel releasing positions, said friction drivers each having a link member pivotally connected with respect to one of said connecting rods to cause said friction drivers to alternately approach and recede from one another and alternately shift said friction drivers between wheel gripping and wheel releasing relation upon angular movement of said drive shaft, whereby one friction driver advances the wheel as the friction drivers recede from one another, and another friction driver advances the wheel as the friction drivers approach each other, said friction drivers including shoes engageable with the wheel, and said link members normally alternately applying pressure to said shoes, and means for shifting the angular relationship between said link members and shoes to hold said shoes permanently in wheel releasing positions.

2. A power transmission mechanism of the character described including a drive shaft, cranks angularly displaced with respect to each other about said drive shaft, connecting rods respectively engaging said cranks in permanently diverging relationship, a driven wheel, friction drivers angularly displaced with respect to one another about said driven wheel and each movable between wheel gripping and wheel releasing positions, said friction drivers each having a member pivotally connected with respect to one of said connecting rods to cause said friction drivers to alternately approach and recede from one another and alternately shift said friction drivers between wheel gripping and wheel releasing relation upon angular movement of said drive shaft, whereby one friction driver advances the wheel as the friction drivers recede from one another, and another friction driver advances the wheel as the friction drivers approach each other, and means for limiting the relative extents of the approaching and receding movements of the friction drivers with respect to each other.

3. A power transmission mechanism of the character described including a drive shaft, cranks angularly displaced with respect to each other about said drive shaft, connecting rods respectively engaging said cranks, a driven wheel, friction drivers angularly displaced with respect to one another about said driven wheel and each movable between wheel gripping and wheel releasing positions, said friction drivers each having a member pivotally connected with respect to one of said connecting rods to cause said friction drivers to alternately approach and recede from one another and alternately shift said friction drivers between wheel gripping and wheel releasing relation upon angular movement of said drive shaft, whereby one friction driver advances the wheel as the friction drivers recede from one another, and another friction driver advances the wheel as the friction drivers approach each other, and links interconnecting said friction drivers which are connected in pivotal relation thereto and to each other to limit the approaching and receding movements of the friction drivers.

4. A power transmission mechanism of the character described including a drive shaft, cranks angularly displaced with respect to each other about said drive shaft, connecting rods respectively engaging said cranks, a driven wheel, friction drivers angularly displaced with respect to one another about said driven wheel and each movable between wheel gripping and wheel releasing positions, said friction drivers each having a member pivotally connected with respect to one of said connecting rods to cause said friction drivers to alternately approach and recede from one another and alternately shift said friction drivers between wheel gripping and wheel releasing relation upon angular movement of said drive shaft, whereby one friction driver advances the wheel as the friction drivers recede from one another, and another friction driver advances the wheel as the friction drivers approach each other, links interconnecting said friction drivers which are connected in pivotal relation thereto and to each other to limit the approaching and receding movements of the friction drivers, and an adjustable control member for said friction drivers which is provided with a slotted portion limiting the movements of said links.

ERNEST PULSFORD.

REFERENCES CITED

The following references are of record in the file of this patent:

UNITED STATES PATENTS

| Number | Name | Date |
| --- | --- | --- |
| 296,161 | Grater | Apr. 1, 1884 |
| 1,168,091 | Maughmer | Jan. 11, 1916 |
| 2,487,494 | Taber | Nov. 8, 1949 |